3,135,738
MODIFICATION OF STARCH WITH N,N' METHYL-
ENE BISACRYLAMIDE, N-METHYLOL ACRYL-
AMIDE, OR ACRYLAMIDE AND FORMALDE-
HYDE
Merchant L. Cushing, Decatur, Ill., assignor to A. E. Staley Manufacturing Company, Decatur, Ill., a corporation of Delaware
Filed Apr. 23, 1959, Ser. No. 808,519
6 Claims. (Cl. 260—233.3)

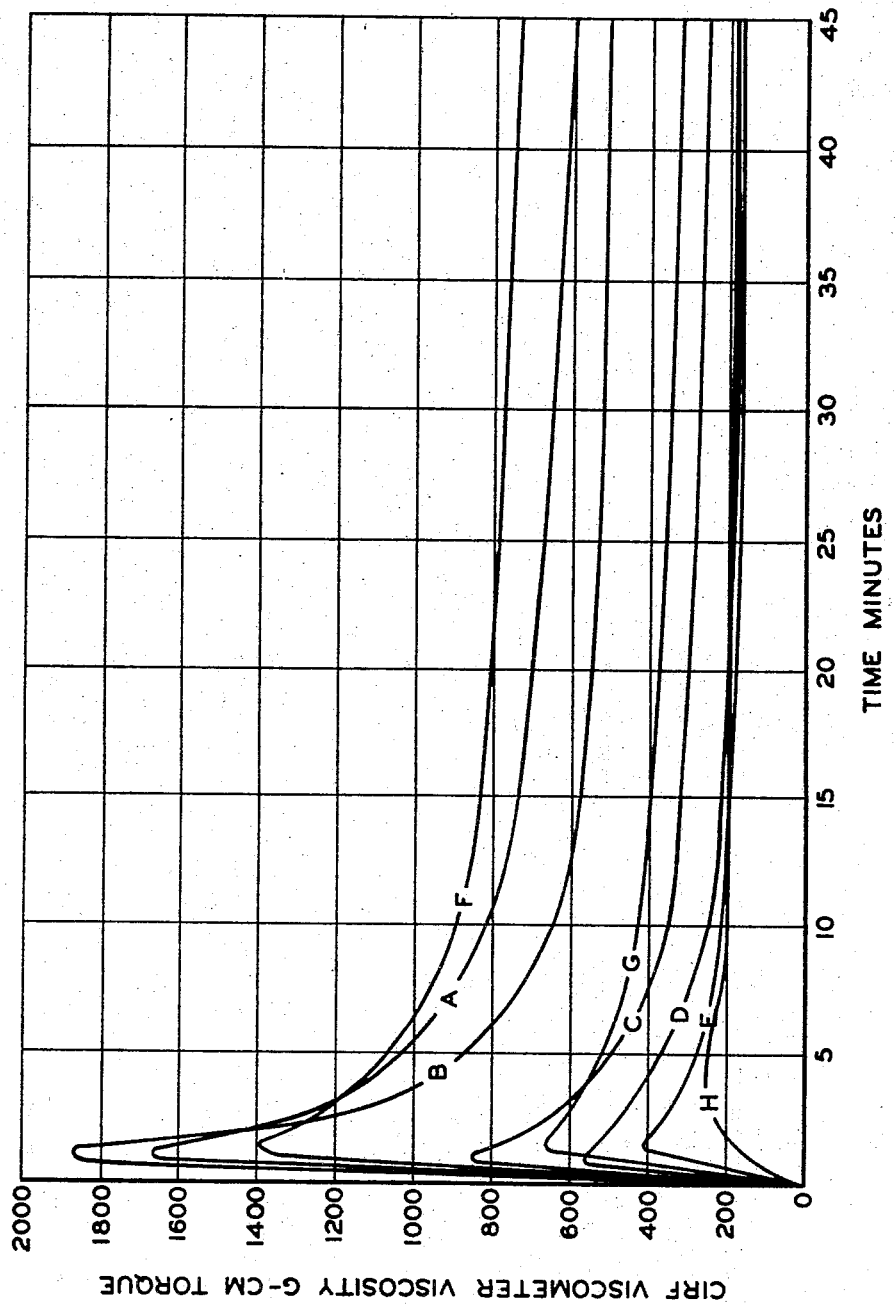

This invention relates to a method of producing a chemically-modified granular starch and to the products of that method. In particular, the invention concerns an acrylamide reaction product of granular starch.

Starch had been used in paper making as sizing, as a filler retention aid and for other purposes. However, in recent years, starch has in many instances been displaced by synthetic polymers, e.g., polyacrylamide, even though the starch is substantially less expensive. The problems in using starch for this purpose are discussed in Kerr Chemistry and Industry of Starch, chapter 18, Academic Press (1950). However, polyacrylamide is substantially more expensive based on unit cost and special equipment is required to disperse it in water and to supply it to the paper-making process. Furthermore, large volumes of water are required because of the high viscosity of the polymers available. The viscosity problem is particularly acute in certain operations in paper making where a material is required that has both low-viscosity and good adhesive strength. Typical of the problem areas in paper making are the size press operation, the size press coating operation, the application of the coating-adhesive formulation and those operations where the retention of filler from re-used "broke" or scrap is difficult.

It is an object of this invention to prepare a new granular starch derivative.

Another object is to provide a granular starch derivative capable of improved filler retention in paper manufacture.

Another object is to improve the water-retention properties of pasted granular starch by a simple, inexpensive modification of the starch.

Other objects will be, in part, apparent and, in part, pointed out hereinafter.

Described briefly, the method of this invention comprises reacting granular starch with acrylamide in the presence of an alkaline catalyst to produce a granular carbamyl ethyl ether of starch. To retain the granular structure, the reaction conditions must be carefully chosen, as described hereafter. The carbamyl ethyl ether is considered to be the result of the reaction between the double bond of acrylamide and a starch hydroxy group with the ether linkage being formed on the terminal carbon atom of the acrylamide.

I am aware that acrylamide has been reacted with cellulose and hydroxyethyl cellulose as described in Patents Numbers 2,618,633 and 6,618,635 (Vaughn). However, as described in those patents, so much alkali must be used (in fact of the order of one mole or more of alkali per anhydroglucose unit) that the alkali cellulose must form as an intermediate and the product amide groups are immediately and substantially completely hydrolyzed to carboxyl groups. There is, of course, a great difference in the chemical and physical structure of cellulose and starch. This is evidently the reason for the preparation by my invention of a granular product which retains and in fact improves the pasting properties of the original starch and yet has the desirable amide substituent.

To retain the granular form of the starch, the reaction in accordance with this invention is performed under conditions that avoid the gelatinization of the product. As is well known, alkali in water causes starch to paste with the granules swelling and the granular structure disappearing. In many applications of starch, the change in properties of the starch from the granular to the pasted form is used by applying a suspension of granular starch and then causing the gelatinization to take place at a particular time in the process. For these applications, it is therefore necessary to maintain the granular form of the product.

More important is the difficulty in reconstituting starch pastes. Many processes of industrial importance use starch pastes. For this purpose, the pastes are freshly prepared from the granular form. The reason is that, while gelatinized starch may be dried (although with difficulty), such "pre-gelatinized" starch does not reconstitute well with water. Furthermore, as the dry, "pre-gelatinized" starch ages, the difficulty in reconstituting it as an aqueous paste increases and other desirable properties also are degraded with time.

I avoid the pasting of the starch by either or both of two techniques: limiting the amount of alkali and employing a reaction medium that inhibits the pasting of the starch. As will be evident from the following discussion, the concentration of alkali that may safely be used will depend upon the particular alkali used and the temperature at which the reaction is performed. That is to say, that as the amide content of the product increases, the pasting temperature decreases so that, if the desired amide content of the product is high, care must be taken to avoid excessive temperatures and alkali concentrations. The reaction media useful in suppressing the gelatinization of starch are known. They include alcohols, particularly the lower alkyl alcohols, and aqueous sodium sulfate, sodium chloride or sodium carbonate brines.

I have also found that I can carry out my reaction under essentially dry conditions. As is well known, starch may appear dry in the visual and tactile sense and yet still contain 25% by weight or more of moisture. I may perform the reaction in this superficially dry condition as illustrated hereafter. Care must nevertheless be taken in washing such a product to keep the alkali content sufficiently low to avoid gelatinization.

In my process I am able to use any of the commonly available starches although I prefer corn starch. Among those that are useful are wheat, tapioca, potato, rice and waxy maize starches and modifications of starch that still retain in substantial degree the granular amylaceous structure, for example, the hydrolyzed, oxidized, and esterified starches. These are comprehended in the term "granular amylaceous substance" or "granular starch" as used herein to describe the class of materials.

In my process, I react the granular amylaceous material with an acrylamide-containing reactant from the group acrylamide-and-formaldehyde mixtures, N,N'-methylene bisacrylamide, and other N-substituted acrylamides. With some of these reactants, particularly the acrylamide-formaldehyde mixtures, the N,N'-methylene bisacrylamide and N-methylol acrylamide, the separated product is often inhibited to pasting in water. Probably this is the result of a cross-linking reaction. In such a reaction, I believe, two acrylamide groups, added to the starch through the reaction between the acrylamide vinyl group and the starch hydroxy group, are linked through a methylene group. The product, when it is pasted, usually has a very high viscosity at a relatively low degree of substitution. On the other hand, some of the products at a very low degree of substitution, have a paste viscosity that can be regulated by adjustment of the pH of the pasting medium. Since the cross-linking of such groups through the methylene group has not been established experimentally, I use the word to describe the product of the reaction of starch with a reagent which is capable of such reaction in accordance with the theory proposed. Such products have new and different properties which I believe are attributable to a reaction of this type.

The following examples illustrate my invention, all parts and percentages being by weight. The starch referred to, unless otherwise specified, is granular native corn starch. The accompanying diagram is a graphic illustration of the viscosity characteristics of the products in accordance with this invention. It is to be understood that the details disclosed are not intended to limit the invention.

EXAMPLE 1

With mechanical stirring, a solution of 5 grams of sodium hydroxide in 50 milliliters of water was added to 500 milliliters of 95% ethyl alcohol. Then 162 grams of powdered corn starch (moisture 10–12%) was added and the suspension was stirred for 30 minutes. Then 7.1 grams of acrylamide was added to the suspension and the stirring was continued for 2 hours, all at room temperature.

Thereafter, the solution was neutralized with 50 milliliters of 10% acetic acid. The product was filtered from the suspension, washed by slurrying with alcohol, filtered again, and finally air-dried.

The nitrogen content of the product was 0.17%, indicating a degree of substitution of about .02 carbamyl ether group per anhydroglucose unit.

Sheets of paper were prepared to illustrate the improvement in filler retention which this modification imparts to the starch. Using a pulp-filler slurry containing 10% $TiO_2$ with no retention agent, with starch and with the product of this example, the ash contents (a measure of the retention of $TiO_2$) were 4.50%, 4.42% and 5.28%, respectively, when the starch products were added at dosage levels of 1.0 percent on the fiber furnish weight.

EXAMPLE 2

In a manner similar to Example 1, 810 grams of powdered corn starch was suspended in 800 milliliters of 95% ethyl alcohol containing 50 grams of sodium hydroxide which had been added with 100 milliliters of water. To this suspension 75 grams of acrylamide was added and the suspension stirred for 6 hours at room temperature. The product was separated by filtration, washed by slurrying in alcohol, refiltered and air-dried. The analysis of the product was 0.62% nitrogen or about .04 carbamyl ether group per anhydroglucose unit.

EXAMPLE 3

A sodium sulfate brine was prepared by saturating 700 cubic centimeters of water with sodium sulfate at 100° F. To this 486 grams of commercially dry starch (10–12% moisture) was added, and the slurry was stirred until the starch was well suspended. Then, with vigorous stirring, 31 grams of acrylamide was added, and finally 13 grams of sodium hydroxide dissolved in approximately 40 milliliters of water was added. The reaction mixture was allowed to stir at 100° F. for 18 hours, then neutralized with dilute hydrochloric acid. The product was separated by filtration and washed thrice by slurrying with water and filtering. This illustrates my preferred method of performing the reaction, and the product contains about 0.85% nitrogen or 0.1 carbamyl ether group per anhydroglucose unit.

EXAMPLE 4

This example illustrates the effect of varying the quantity of sodium hydroxide catalyst. The reaction conditions were the same as in Example 3, except that the amount of sodium hydroxide was varied.

Table 1

| NaOH, grams: | Percent N in product |
|---|---|
| 20 | 0.87 |
| 13 | 0.88 |
| 17 | 0.85 |
| 9 | 0.84 |
| 5 | 0.34 |

The results in Table 1 indicate that, under these conditions, to obtain the maximum degree of substitution, at least about 3 grams of sodium hydroxide must be used per equivalent weight of anhydroglucose unit. In these and other experiments, it was noted further that more than about 7 grams of sodium hydroxide per anhydroglucose unit produces sufficient swelling of the starch to interfere with the reaction. That is to say, in order to obtain an easily filterable product, the reaction conditions (alkaline catalyst, temperature, reaction medium) are chosen in such a way that the gelatinizing or swelling effect on the product is no greater than that produced by 7 parts by weight of sodium hydroxide (0.175 mole) per mole of starch with the starch suspended in saturated aqueous sodium sulfate at 100° F.

EXAMPLE 5

This example illustrates the effect of temperature on the efficiency of the reaction. The procedure followed was the same as that of Example 3, except that the temperature was maintained at 80° F. and the sodium hydroxide contents were varied. The results are displayed in Table 2. If Tables 1 and 2 are compared, it will be evident that the reaction is favored by a higher temperature.

Table 2

| NaOH, grams: | Percent N in product |
|---|---|
| 17 | 0.67 |
| 13 | 0.57 |
| 9 | 0.40 |

EXAMPLE 6

This example illustrates the effects of varying the time, temperature, and the concentration of sodium hydroxide. Again, the procedure used was that of Example 3, with the sodium hydroxide content, time and temperature being varied as shown in Table 3.

Table 3

| Sample No. | NaOH, grams | Time, hours | Temperature, ° F. | Percent N |
|---|---|---|---|---|
| 1 | 8.6 | 2 | 115 | 0.18 |
| 2 | 8.6 | 4 | 115 | 0.30 |
| 3 | 8.6 | 6 | 115 | 0.45 |
| 4 | 8.6 | 8 | 115 | 0.54 |
| 5 | 13.0 | 2 | 100 | 0.32 |
| 6 | 13.0 | 6 | 100 | 0.51 |
| 7 | 17.3 | 2 | 115 | 0.40 |
| 8 | 17.3 | 4 | 115 | 0.66 |
| 9 | 17.3 | 6 | 115 | 0.76 |
| 10 | 17.3 | 8 | 115 | 0.83 |

These results indicate that the reaction is favored by the higher temperatures and higher concentrations of alkali. It also indicates that the time required for the reaction depends upon concentration of the catalyst, as expected.

Sample numbers 7 through 10 were used in preparing sheets of paper. The conditions were: bleached sulfite pulp, 10% $TiO_2$, 2% rosin sized, pH of 5.0, 0.5% starch or acrylamide-modified starch based on the fiber furnish. The results are shown in Table 4.

Table 4

| Sample No: | Percent $TiO_2$-ash |
|---|---|
| Pearl starch | 4.41 |
| 7 | 5.08 |
| 8 | 5.30 |
| 9 | 5.54 |
| 10 | 4.93 |

EXAMPLE 7

This example illustrates the effect of varying the proportions of acrylamide. The procedure followed was that of Example 3, except that the acrylamide and alkali contents were varied as shown in Table 5. The results are displayed in Table 5.

*Table 5*

| NaOH, grams | Acrylamide, grams | Percent N | Percent Yield |
|---|---|---|---|
| 13 | 4 | 0.11 | 68.4 |
| 13 | 15.5 | 0.44 | 72.2 |
| 13 | 31 | 0.83 | 70.0 |
| 20 | 62 | 1.55 | 69.5 |
| 20 | 100 | 2.35 | 70.0 |

The product of this reaction between starch and acrylamide pastes in water at a lower temperature than the parent starch. Upon cooling the paste does not congeal, and is very viscous and rubbery in texture. It was found that the pasting temperature decreases as the degree of substitution increases. For example, a product having about 0.1 acrylamide units per anhydroglucose unit pastes at about 136° F., while a product having 0.33 acrylamide units per anhydroglucose unit pastes at 124° F. On the other hand, the viscosity of the paste increases correspondingly with the degree of substitution and this is illustrated in the accompanying figure. This figure is a graph of viscosity against time as determined on a Corn Industries Research Foundation Viscometer. The viscosity is given in gram-centimeters torque and the time is given in minutes as each sample was heated at the same, constant rate. In the graph, the curves labeled A, B, C, D and E are for various proportions of acrylamide to starch, as shown in Table 6. These samples were prepared in the manner described for Example 3, except that the proportion of acrylamide was varied. For comparison, there is included the curve (designated H) obtained in a similar test at the same solids content using a commercial, thick-boiling modified starch, that prepared by the method of Patent Number 2,838,465.

*Table 6*

| Curve | Grams Acrylamide Used per 486 grams starch | Percent N in Product |
|---|---|---|
| A | 100 | 2.40 |
| B | 62 | 1.60 |
| C | 31 | 0.75 |
| D | 15.5 | 0.49 |
| E | 8 | 0.23 |

These curves illustrate the fact that the products in accordance with this invention have a higher initial paste viscosity and maintain a high viscosity. It is evident, also, that, following the initial peak in the viscosity curve, the viscosity is quite stable at the high value. This ability to gelatinize at a relatively low temperature to produce a paste of high viscosity is useful in adhesives for the manufacture of corrugated paperboard, for example.

EXAMPLE 8

This example illustrates the preparation of the acrylamide modified starch in accordance with this invention by performing the reaction in the superficially dry state. Dry native corn starch (486 grams, or three equivalents of the anhydroglucose unit), soda ash (0.325 moles) and hydrated lime (0.325 moles) were added to a Reed mixer (a dry powder blender). Then 8 grams of acrylamide dissolved in 40 cubic centimeters of water was added. The mixture was stirred for 7 hours at 100° F., and during the last hour of operation, the lid of the mixer was removed to permit the moisture to evaporate. The product was dried further by spreading it on a tray and leaving it overnight at room temperature.

A sample of the dried starch derivative was suspended in water, neutralized with dilute sulfuric acid, filtered and washed three times by suspending in water and filtering. The nitrogen analysis was essentially the same as that obtained had the reaction been performed in aqueous suspension. In this case, sufficient water was used in suspending the product to avoid pasting under the highly alkaline conditions of the experiment.

As noted before, when a granular unpasted product is to be produced, it is necessary to choose carefully the reaction conditions. Particularly, by using a special solvent such as the alcohols or saturated sodium sulfate, the gelatinization of the product is avoided. Generally speaking, this is somewhat disadvantageous because of the expense and disposal problems. However, these disadvantages may be alleviated by either of two methods: The sodium sulfate brine may be reused or saturated sodium carbonate may be used as the alkali since sodium carbonate brine also prevents gelatinization of the starch. These alternatives are illustrated in the following two examples.

EXAMPLE 9

The procedure of Example 3 was followed to prepare a product having a nitrogen content of 0.79%. The neutralized brine was then reused in a repetition of the procedure of Example 3. The product of the second reaction analyzed 0.82% nitrogen. In the first run, 67% of the acrylamide reacted with the starch and in the second, 69%.

EXAMPLE 10

Commercially dried starch (486 grams) was suspended in 700 milliliters of water saturated with sodium carbonate. While stirring, 31 grams of acrylamide was added. Stirring was continued for 6 hours with the reaction medium maintained at 125° F. After separating the product by filtration, the reaction product was washed by re-suspending in water and filtering through three cycles. The separated product was oven dried, and the nitrogen assay was 0.42%. When this granular product was cooked in water, a clear, viscous, non-congealing paste was produced. It is evident from this example that the use of the sodium carbonate brine permits the reaction to be carried out at a somewhat higher temperature and still avoid the gelatinization of the product. However, in comparing this experiment with those in which sodium hydroxide was used as catalyst with a sodium sulfate brine, it is evident that the sodium carbonate is a less efficient catalyst for the present reaction.

EXAMPLE 11

This example illustrates the starch acrylamide reaction in accordance with this invention using still another catalyst. To 1038 cubic centimeters of aqueous starch slurry containing 486 grams of starch dry substance, 9 grams of calcium hydroxide and 13 grams of sodium carbonate were added with rapid stirring. Eight grams of acrylamide was added, and the reaction mixture was stirred for 18 hours at 100° F. The slurry was then neutralized, filtered, washed and dried as described in the previous examples. The assay was 0.22% nitrogen, comparable to the results obtained under similar conditions using sodium hydroxide-sodium sulfate.

Other alkaline catalysts may also be used such as ammonia and tertiary and quaternary amines. However, these I have found are considerably less effective as catalysts and I, therefore, prefer to use the alkali and alkaline earth metal hydroxides and the alkali metal carbonates or mixtures thereof.

EXAMPLE 12

This example illustrates the use of a sodium chloride brine in preventing gelatinization of the product. Two hundred fifty-two pounds of sodium chloride is dissolved in 77 gallons (641 pounds) of water. (As noted before, sodium chloride is the equivalent of sodium sulfate in preventing the premature gelatinization of the starch.) To the sodium chloride brine, there is added 500 pounds of commercial corn starch (moisture about 10-12%), and the brine is agitated to suspend the starch. Aqueous sodium hydroxide (18 pounds in 125 pounds of water) is added until the sodium hydroxide content of the suspension is 4.1 pounds per 100 pounds of starch dry substance. The temperature is carefully regulated to keep it below 115° F. After stirring for 30 minutes, 7.38 pounds of acrylamide per 100 pounds of starch dry substance, about 32.5 pounds total, is added. The reaction is carried out with agitation for 6 hours, the temperature being maintained close to but below 115° F. At the end of this time, the suspension is neutralized to a pH of 6.5 to 7.5 with dilute hydrochloric acid. The product is separated from the suspension by filtering and washed on the filter. It is then reslurried in fresh water and again filtered and washed. The washing is continued until the wash water is substantially free of chloride. The granular product, after drying, is then ground to the Pearl form. Care should be taken to separate the product from the alkaline brine as soon as possible after completing the reaction in order to avoid hydrolysis of the amide groups.

EXAMPLE 13

This example illustrates the effect of formaldehyde on the reaction in accordance with this invention. The procedure of Example 3 was followed using 31 and 8 grams of acrylamide in separate samples. To each of the samples 3 cubic centimeters of 37% formaldehyde in water was added just after the acrylamide had been added. The products contained 0.82% nitrogen and 0.26% nitrogen, respectively, approximately the expected nitrogen content had the formaldehyde not been added. The two products were gelatinized in water and it was found that the pasting temperatures were 142° and 156° F., respectively. A viscosity test on the Corn Industries Research Foundation Viscometer was also run on these products and, for comparison, the curves obtained are shown in the accompanying figure as curves F and G, respectively. It is clear from the curves that the small proportion of formaldehyde produces a substantial increase in the viscosity of the pasted product even though the pasting temperature is not markedly increased. This is of advantage in certain applications, for example in corrugated paperboard manufacture, where the desiderata are a low pasting temperature and a high viscosity paste.

It is to be noted that this reaction with formaldehyde in an alkaline medium is unusual. Normally, as illustrated by Patent Number 2,838,465, chemical modification of starch using formaldehyde as a reagent requires an acid medium.

EXAMPLE 14

This example illustrates the reaction of granular starch with N,N'-methylene bisacrylamide. A 20° Baumé slurry of starch containing 500 grams of starch dry substance was made alkaline by adding 3.5 grams of sodium hydroxide. To the alkaline slurry there was added 40 milliliters of a 1% aqueous solution of N,N'-methylene bisacrylamide, or 0.08% of the starch weight. The reactants were heated at 120° F. for 2 hours and then the slurry was neutralized to about 6.5 pH. It was then filtered and dried in an oven to produce a granular, unpasted product. The product, when cooked at a pH of 6.3 formed a paste similar to that of curve H in the accompanying drawing. However, when cooked at a pH of 9.0, it was relatively thin in viscosity. Similar results were obtained using 0.05% instead of 0.08% N,N'-methylene bisacrylamide. The development of viscosity when pasting at slightly acid or neutral pH is of value in adhesives used for corrugated board, where alkali is to be avoided, e.g., when the board is used for packing plate glass.

EXAMPLE 15

Sodium hydroxide (13 grams) dissolved in 50 milliliters of water was added to a slurry of 486 grams of granular corn starch in 800 milliliters of ethyl alcohol. N,N'-methylene bisacrylamide (31 grams) was added and the reaction mixture was stirred for 64 hours. After filtering, washing with water and air drying, the nitogen content of the product was 0.44%. This modified starch could not be gelatinized in water using the normal conditions for cooking, i.e., it was inhibited to pasting or gelatinization.

EXAMPLE 16

To a solution of 5 grams of sodium hydroxide in 250 milliliters of ethanol, 162 grams of starch was added with stirring. When the starch was suspended, 10 grams of N-methylol acrylamide was added with stirring. The reaction was continued for 2 hours and the washed, dried product contained 0.18% nitrogen. In an experimental manufacture of a sheet of paper, this product improved the filler retention as measured by the ash content of the paper. This is another example of an acrylamide derivative that yields cross-linking through a methylene group.

EXAMPLE 17

This example illustrates the reaction of starch with acrylamide having other substituents on the nitrogen. The reaction conditions were similar to those of Example 3 and the unsubstituted acrylamide was replaced with the following N-substituted acrylamides:

N,N-diethyl acrylamide:

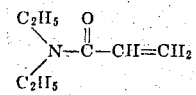

N-(2 pyridyl) acrylamide:

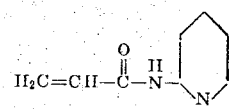

N-(diethylamino ethyl) acrylamide:

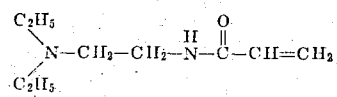

N-(morpholinyl N-propyl) acrylamide:

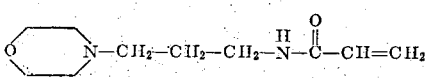

Corresponding substituted granular starch products were obtained although in relatively low yield. The reagents were prepared by condensing acrylyl chloride with the corresponding amine, e.g., with 2-amino pyridine.

Since many embodiments of this invention may be made and since many changes may be made in the embodiments described, the foregoing is to be interpreted as illustrative only and the invention is defined in the claims following hereafter.

I claim:

1. The method of chemically modifying starch that comprises reacting granular starch with N,N'-methylene bisacrylamide in the presence of an effective quantity of an alkaline catalyst while maintaining the starch in ungelatinized condition to produce an ungelatinized starch derivative containing carbamyl ethyl group, the reaction conditions having a gelatinizing effect on the product no greater than about 7 parts by weight of sodium hydroxide per anhydroglucose unit in saturated aqueous sodium sulfate at 100° F.

2. The method of chemically modifying starch that comprises reacting granular starch with N-methylol acrylamide in the presence of an effective quantity of an alkaline catalyst while maintaining the starch in ungelatinized condition to produce an ungelatinized starch derivative containing carbamyl ethyl group, the reaction conditions having a gelatinizing effect on the product no greater than about 7 parts by weight of sodium hydroxide per anhydroglucose unit in saturated aqueous sodium sulfate at 100° F.

3. The method of chemically modifying starch that comprises reacting granular starch with a mixture of acrylamide and formaldehyde in the presence of an effective quantity of an alkaline catalyst while maintaining the starch in ungelatinized condition to produce an ungelatinized starch derivative containing carbamyl ethyl group, the reaction conditions having a gelatinizing effect on the product no greater than about 7 parts by weight of sodium hydroxide per anhydroglucose unit in saturated aqueous sodium sulfate at 100° F.

4. A crosslinked carbamyl ethyl starch ether containing carbamyl ethyl groups at least partly crosslinked through methylene groups introduced by reaction with formaldehyde.

5. A crosslinked carbamyl ethyl starch ether containing carbamyl ethyl groups at least partly crosslinked through methylene groups introduced by reaction with N-methylol acrylamide.

6. A crosslinked carbamyl ethyl starch ether containing carbamyl ethyl groups at least partly crosslinked through methylene groups introduced by reaction with N,N'-methylene bisacrylamide.

References Cited in the file of this patent

UNITED STATES PATENTS

| | | |
|---|---|---|
| 2,121,076 | Ellis | June 21, 1938 |
| 2,302,309 | Glarum et al. | Nov. 17, 1942 |
| 2,338,681 | Bock et al. | Jan. 4, 1944 |
| 2,388,597 | Burke | Nov. 6, 1945 |
| 2,500,950 | Konigsberg | Mar. 21, 1950 |
| 2,618,633 | Vaughan | Nov. 18, 1952 |
| 2,725,362 | Gaver | Nov. 29, 1955 |
| 2,837,512 | Mantell | June 3, 1958 |
| 2,928,827 | Paschall | Mar. 15, 1960 |
| 2,935,509 | Paschall | May 3, 1960 |
| 2,938,026 | Stephens et al. | May 24, 1960 |
| 3,033,852 | Paschall | May 8, 1962 |
| 3,035,045 | Trimnell | May 15, 1962 |

OTHER REFERENCES

The Condensed Chemical Dictionary—Fifth Edition, 1956, Reinhold Publishing Corp., New York, page 717.